Oct. 14, 1930.    B. A. SMITH    1,778,091
POWER TAKE-OFF MECHANISM
Filed July 25, 1928    2 Sheets-Sheet 1

B. A. Smith
By Marks & Clerk
Attys.

Oct. 14, 1930.    B. A. SMITH    1,778,091
POWER TAKE-OFF MECHANISM
Filed July 25, 1928    2 Sheets-Sheet 2

B. A. Smith
INVENTOR

Patented Oct. 14, 1930

1,778,091

UNITED STATES PATENT OFFICE

BRUCE ALFRED SMITH, OF BOX HILL, VICTORIA, AUSTRALIA

POWER-TAKE-OFF MECHANISM

Application filed July 25, 1928, Serial No. 295,169, and in Australia August 18, 1927.

This invention relates to power raising, lowering and like adjusting devices for implements and machines, and refers especially, but is not limited to devices for attachment to mechanical traction units whereby agricultural implements or other machines being hauled thereby may be raised and lowered with ease and convenience.

A disadvantage experienced in the tractor haulage of agricultural implements is that it is necessary either to have a man on each implement to operate the raising and lowering controls or to employ special implements provided with control mechanism whereby the same may be raised and lowered by the operator on the tractor.

Each of these alternatives is obviously costly, especially when machines designed for haulage by draught animals have to be discarded, in order that a tractor may be employed.

Now the object of the present invention is to provide a device of simple, economical and compact construction adapted to be fitted to a tractor whereby implements or machines drawn thereby and whether designed for animal or tractor haulage may be raised or lowered by an operator on the tractor.

I accomplish the abovementioned objects by providing an oscillatably mounted lever on the chassis of a tractor, mechanism associated with the power plant thereof for displacing the said lever and a connection or connections passing from the lever to the raising and lowering mechanism of an implement or machine attached to the tractor, The means for adjusting the position of the oscillatable lever may comprise a connecting rod associated at one end with the lever and connected at its opposite end to a crank fitted to a worm wheel, a worm engaging the worm wheel, a bevel wheel having a fixed relationship with the worm, opposed bevel pinions meshing with the bevel wheel and clutch mechanism associated with the bevel pinions and the power plant of the tractor whereby the crank may be rotated in either direction by the manipulation of the clutch mechanism.

A friction clutch is preferably employed in order that the shock of engagement may be reduced to a minimum and whereby slipping will occur when abnormal loads are imposed on the associated mechanism or implement.

Having briefly described the object and nature of the invention reference will now be had to the accompanying sheets of explanatory drawings, wherein—

Figure 1:
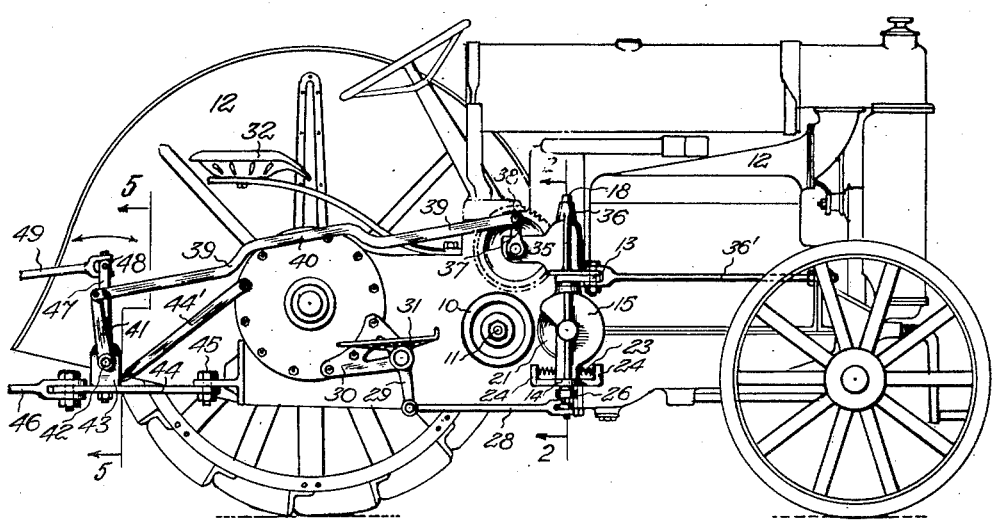
Figure 1 is a view in side elevation of a tractor fitted with raising and lowering mechanism constructed and arranged in accordance with the present invention. In this view one of the rear wheels is removed for convenience in illustration.
Figure 2:
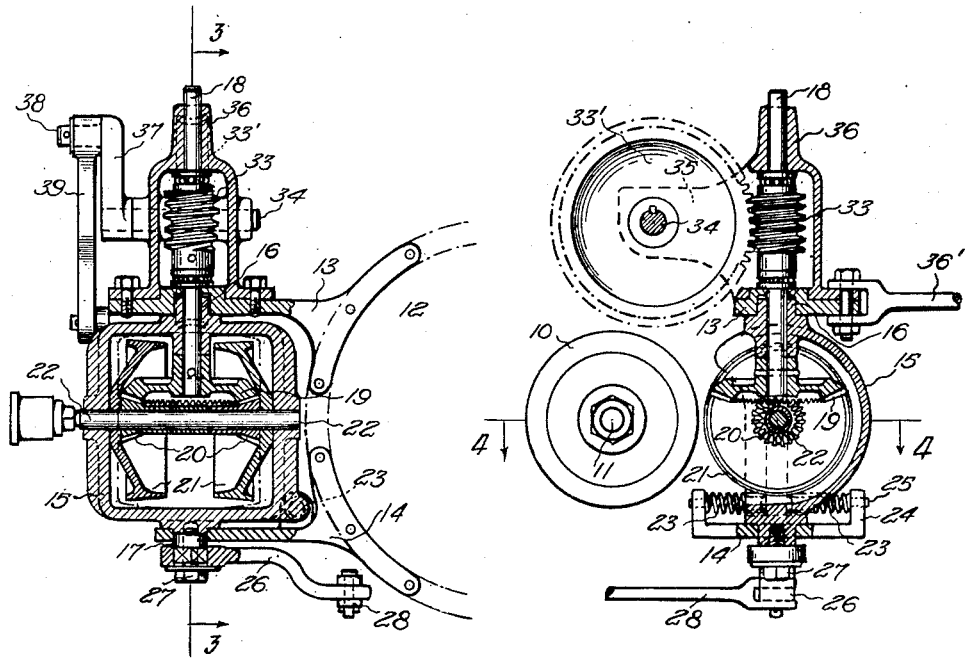
Figure 2 is a view in sectional end elevation taken on the line 2—2 of Figure 1, and is drawn to a larger scale.

The drawings illustrate the application of the invention to a tractor of the "Fordson" type which has a laterally disposed power take-off pulley fitted thereto, but it will be obvious that the invention may, with equal facility, be applied to tractors of various types irrespective of the disposition of the take-off pulley.

Referring to the drawings, the reference numeral 10 designates the take-off pulley fitted in the usual manner to a transverse shaft 11 operatively connected with the power plant of a tractor 12. Upper and lower brackets 13 and 14 respectively, are fitted to a rigid portion of the tractor casing and project laterally therefrom in advance of the take-off pulley 10. These brackets are adapted to oscillatively support a cage 15 provided at its upper and lower ends with centrally disposed stems 16 and 17, respectively, engaging holes in the abovementioned brackets.

A vertically disposed spindle 18 is fitted rigidly to the upper portion of the cage 15 and in alignment with the axis thereof and the lower end of the same projects into the cage and is fitted rigidly with a bevel crown wheel 19. The bevel wheel 19 constantly meshes with a pair of opposed bevel pinions 20 fitted to friction wheels 21 mounted on a transverse spindle 22 rotatively mounted in the cage 15.

Figure 3:
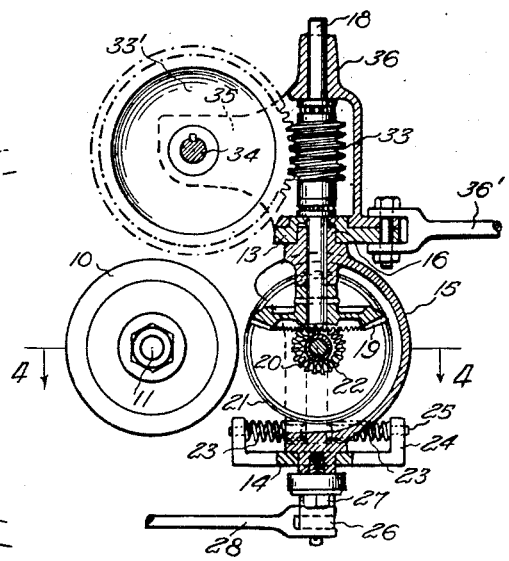
Figure 3 is a view in sectional elevation taken on the line 3—3 of Figure 2.
Figure 4:
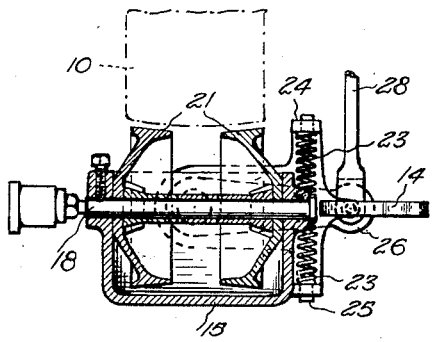
Figure 4 is a view in sectional plan taken on the line 4—4 of Figure 3.
Figure 5:
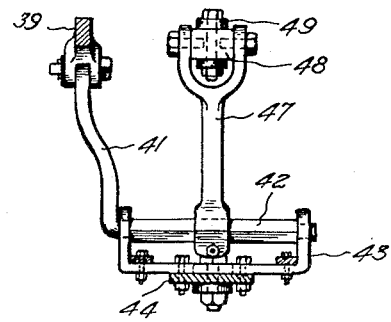
Figure 5 is a view in sectional end elevation taken on the line 5—5 of Figure 1.
Figure 6:
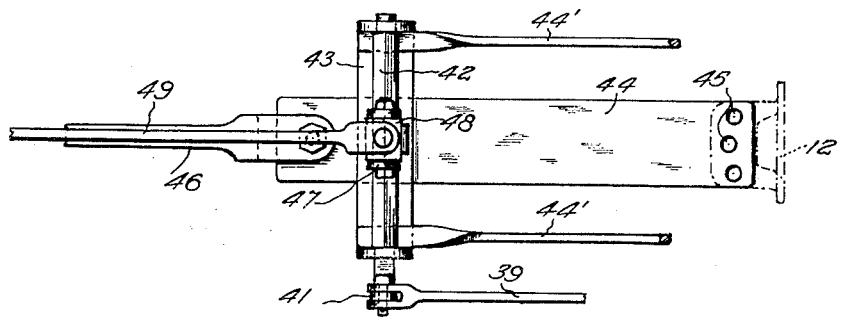
Figure 6 is a view in plan of a rear portion of the mechanism and hereinafter is fully described.

The faces of the friction wheels 21 are arranged in proximity to the face of the take-off pulley 10, but, the same are normally maintained out of engagement therewith by means of centralizing compression springs 23 fitted at their outer ends to extensions 24 on the brackets 14 and bearing at their inner ends against the cage 15, see Figures 1 and 3. If desired the strain on these springs may be adjusted by means of screws 25.

An arm 26 is fitted to the lower stem 17 beneath the adjacent bracket 14 by means of a screw 27 and the free end of this lever is connected by means of a link 28 to an arm 29 pivotally mounted on a bracket 30 fitted to an adjacent portion of the tractor.

A foot lever 31 is formed integrally with the depending arm 29 and the same is arranged in proximity to the seat 32 provided for the operator of the tractor.

It will be observed that, when the foot lever is displaced in one direction the cage 15 carrying the friction wheels 21 is moved so that one of the said friction wheels engages the face of the take-off pulley 10, thus causing the vertical spindle 18 to be rotated in one direction by means of the bevel gearing associated therewith. When, however, the foot lever 31 is actuated in a reverse direction to cause the opposite friction wheel to bear against the take-off pulley, the vertical spindle 18 is rotated in a reverse direction by the bevel gearing.

A lining of suitable friction material may, if preferred, be provided on the face of the take-off pulley.

A worm 33 is rigidly secured to the spindle 18 above the bracket 13 and the same meshes with a worm wheel secured to a spindle 34 rotatively supported in lateral extensions 35 formed on a bearing bracket 36 fitted to the bracket 13.

An adjustable stay 36' is provided to hold the brackets 13 and 36 rigidly in position.

One end of the spindle 34 is fitted with a crank 37 carrying a crank pin 38 pivotally engaged by a connecting rod 39.

The connecting rod is given a set intermediate its ends as indicated at 40 (Figure 1) in order that the same may not foul the axle of the driving wheels and the rear end of the connecting rod is pivotally connected to an upwardly projecting arm 41 fitted to a rock shaft 42.

The rock shaft 42 is oscillatively mounted in a bracket 43 rigidly secured to a draft plate 44 attached by bolts 45 to the rear of the tractor casing, and this plate may be firmly held against bending strains by means of stays 44'.

A rigid draft member 46 is pivotally secured at its forward end to the draft plate 44, whilst, its rear end is adapted to be connected to any implement or machine (not shown in the drawings) which it is desired to transport by means of the tractor.

A lever 47 is rigidly secured to a central portion of the rock shaft 42 and the upper end of the lever is forked to pivotally support an oscillatable block 48 to which is pivotally connected the forked forward end of the control rod 49. The pivoted connection between the forked end of the rod and the oscillatable block is disposed at right angles to the firstmentioned connection, thereby forming a universal joint which will function correctly irrespective of undulations in the ground or turning movements of the tractor.

The rear end of the control rod is adapted to be connected to the raising and lowering lever of the attached implement from which the pawl and rack or other form of retaining mechanism is removed.

In the case of an implement provided with more than one raising and lowering lever, as for example, different types of ploughs, the said raising and lowering levers may be link connected in order that the same will operate in unison, and the rear end of the control rod may then be connected to the front or other most convenient raising and lowering lever on the implement.

In operation, when the foot lever 31 is disposed in one direction, one of the friction wheels 21 engages the adjacent face of the take-off pulley 10, and motion is thereby imparted by means of the bevel and worm gearing previously described, to the crank 37.

The movement of the crank 37 causes the rock shaft 32 at the rear of the tractor to be displaced and the motion of the same is transferred to the raising and lowering mechanism of an implement by means of the control rod 49.

When the foot lever is released after adjusting the raising and lowering mechanism to a required position, the centralizing springs 23 will return the cage 15 carrying the friction wheels 21 to its normal position; that is, with both friction wheels out of engagement with the face of the take-off pulley.

It will be understood that the use of the worm and worm wheel gearing obviates the necessity of providing additional mechanism for retaining the raising and lowering gearing in any adjusted position.

By arranging the pivot point of the rigid draft member 46 in close proximity to the lever 47 the raising and lowering mechanism of an implement connected to the control rod 49 is not materially affected during turning movements If desired, however, the pivotal connection of this rigid member 46 may be arranged directly below the said lever 47, so that relative movement will be eliminated.

The lever 47 may be adjusted axially on the rock shaft in order that the same may be arranged adjacent to the draft member 46 when the latter is located on one side of the centre line of the tractor; as, for example, in the case of an orchard plow.

By employing a friction clutch as illustrated in the drawings, slipping will occur between the active members when abnormal loads are applied to the implement, thus preventing damage to the associated parts.

Furthermore, such a construction results in a compact unit which may be readily removed from a tractor when not in use, and which does not necessitate any alteration to the tractor itself.

When the displacement of the rock shaft 42 is effected by means of a crank and connecting rod, it is unnecessary to provide release mechanism adapted to prevent damage to the machine, should an operator not remove his foot from the control lever when the implement or machine is completely raised or lowered. This is obvious from the fact that, if the crank is permitted to rotate continuously in either direction, the rock shaft 42 is merely oscillated.

The use of the invention on a tractor enables the raising and lowering mechanism of agricultural implements and machines to be simplified and cheapened in construction and provides a power lift for implements or machines designed to be drawn by draught animals and which ordinarily cannot be economically used in conjunction with tractors.

I claim:—

1. Power operated mechanism for tractors furnished with a take-off pulley, comprising a cage oscillatively mounted adjacent to the pulley, a pair of friction wheels rotatively supported in the cage, bevel pinions fixedly associated with the friction wheels, a spindle rotatively mounted in the cage, a crown wheel on the spindle meshing with the bevel pinions, lever and link mechanism for oscillating the cage to place one or other of the friction wheels in contact with the pulley, a rotatively mounted crank, gearing for imparting motion from the spindle to the crank, and a lever oscillatively mounted on the rear of the tractor and operatively connected to the crank.

2. Power operated mechanism for tractors furnished with a take-off pulley comprising a cage oscillatively mounted adjacent to the pulley, a pair of friction wheels rotatively supported in the cage, oppositely disposed bevel pinions rigidly associated with the adjacent faces of the friction wheels, a spindle rotatively mounted in the cage, a crown wheel on the spindle meshing with the bevel pinions, a manually operated lever and link connection for oscillating the cage to place one or other of the friction wheels in contact with the pulley, a worm on the spindle, a rotatively mounted worm wheel meshing with the worm, a crank fixedly associated with the worm wheel, and a lever oscillatively mounted on the rear of the tractor and operatively connected to the crank.

3. Power take-off mechanism for tractors furnished with a take-off pulley, comprising a cage oscillatively mounted adjacent to the pulley, a pair of friction wheels rotatively supported in the cage and parallel with the pulley, a bevel pinion fixedly associated with the inner face of each friction wheel, a crown wheel meshing with the bevel pinions, a rotatively mounted spindle supporting the crown wheel, a worm on the spindle, a rotatively mounted worm wheel meshing with the worm, a crank rigidly associated with the worm wheel, a rock shaft on the rear of the tractor, an arm on the rock shaft, a link connecting the arm to the crank, a lever fitted to the rock shaft, a control rod attached to the lever, and means for oscillating the cage to place one or other of the friction wheels in contact with the pulley to impart movement to the gearing to cause the lever to be oscillated in a required direction.

4. In power operated mechanism according to claim 3, centralizing springs bearing on opposite sides of the cage, and screws for adjusting the pressure exerted by the springs whereby the friction wheels will normally be retained out of contact with the pulley.

5. In power operated mechanism according to claim 3, a foot operated lever pivoted on the tractor, an arm projecting laterally from the cage, and a link connecting the foot operated lever to the arm whereby when the said lever is actuated it will place one or other of the friction wheels in contact with the pulley.

In witness whereof I hereunto affix my signature.

BRUCE ALFRED SMITH.